(12) United States Patent
Coombs et al.

(10) Patent No.: US 6,814,364 B2
(45) Date of Patent: Nov. 9, 2004

(54) SUSPENSION SYSTEM FOR A VEHICLE

(75) Inventors: Joshua D. Coombs, Whitmore Lake, MI (US); Maged Radamis, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 154 days.

(21) Appl. No.: 10/223,494

(22) Filed: Aug. 19, 2002

(65) Prior Publication Data

US 2003/0001353 A1 Jan. 2, 2003

Related U.S. Application Data

(63) Continuation-in-part of application No. PCT/US01/48488, filed on Dec. 7, 2001.
(60) Provisional application No. 60/251,951, filed on Dec. 7, 2000.

(51) Int. Cl.[7] ............................................. B60G 15/07
(52) U.S. Cl. ...................... 280/124.154; 280/124.157; 280/124.158; 280/124.159
(58) Field of Search ....................... 280/124.1, 124.112, 280/124.157, 124.158, 124.159, 124.154, 124.16

(56) References Cited

U.S. PATENT DOCUMENTS

| | | | |
|---|---|---|---|
| 2,070,440 A | | 2/1937 | Maddin |
| 3,154,317 A | | 10/1964 | Gustafsson |
| 3,582,106 A | * | 6/1971 | Keijzer .................... 267/64.19 |
| 3,603,576 A | | 9/1971 | Hahn |
| 3,627,348 A | | 12/1971 | Klees et al. |
| 3,653,676 A | * | 4/1972 | Higginbotham .......... 280/6.159 |
| 3,709,517 A | | 1/1973 | Wossner |
| 3,871,635 A | | 3/1975 | Unruh et al. |
| 3,895,816 A | * | 7/1975 | Takahashi et al. ....... 280/5.503 |

(List continued on next page.)

OTHER PUBLICATIONS

S. Ikenaga et al., *Active Suspension Control Using a Novel Strut and Active Filtered Feedback Design and Implementation*, Proceedings of the 1999 IEEE International Conference on Control Application, Kohala Coast—Island of Hawaii, August 22–27, 1999, pp. 1502–1508.

*Primary Examiner*—Toan C To
(74) *Attorney, Agent, or Firm*—Brinks Hofer Gilson & Lione

(57) ABSTRACT

A suspension system for a vehicle having left and right wheels is disclosed and claimed. The system includes first and second suspension struts and first and second hydraulic cavities to supply first and second suspending spring force for the left and right wheels, respectively. The system also includes a volume modulator to selectively push fluid into and vent fluid from the first and second hydraulic cavities, thereby actively modulating the first and second suspending spring forces. The volume modulator includes first and second modulator pistons and first and second cavity-side valves. In a preferred embodiment, the modulator pistons are cycled and the cavity-side valves are opened and closed to counteract roll of the vehicle. Further, in a preferred embodiment, the first modulator piston and the second modulator piston are located approximately 180° apart relative to an eccentric to minimize power consumption of the volume modulator during roll of the vehicle.

14 Claims, 5 Drawing Sheets

U.S. PATENT DOCUMENTS

| | | | | |
|---|---|---|---|---|
| 3,895,820 A | * | 7/1975 | Takahashi et al. | 280/6.158 |
| 3,961,336 A | * | 6/1976 | Walker et al. | 346/139 C |
| 4,371,317 A | | 2/1983 | Heibel | |
| 4,441,593 A | | 4/1984 | Axthammer | |
| 4,556,718 A | * | 12/1985 | Chastrette et al. | 549/449 |
| 4,589,678 A | | 5/1986 | Lund | |
| 4,659,106 A | * | 4/1987 | Fujita et al. | 280/124.103 |
| 4,696,489 A | | 9/1987 | Fujishiro et al. | |
| 4,735,402 A | | 4/1988 | Davis | |
| 4,809,179 A | | 2/1989 | Klinger et al. | |
| 5,011,180 A | | 4/1991 | Dunwoody | |
| 5,020,826 A | * | 6/1991 | Stecklein et al. | 280/124.159 |
| 5,054,808 A | * | 10/1991 | Tsukamoto | 280/5.5 |
| 5,098,119 A | * | 3/1992 | Williams et al. | 280/5.507 |
| 5,105,358 A | * | 4/1992 | Takase et al. | 701/37 |
| 5,130,926 A | * | 7/1992 | Watanabe et al. | 701/37 |
| 5,137,299 A | | 8/1992 | Jones | |
| 5,152,547 A | | 10/1992 | Davis | |
| 5,156,645 A | * | 10/1992 | Tsukamoto et al. | 280/5.501 |
| 5,231,583 A | | 7/1993 | Lizell | |
| 5,239,471 A | * | 8/1993 | Takahashi | 701/37 |
| 5,259,738 A | | 11/1993 | Salter et al. | |
| 5,261,455 A | * | 11/1993 | Takahashi et al. | 137/625.64 |
| 5,265,913 A | * | 11/1993 | Scheffel | 280/6.158 |
| 5,316,272 A | | 5/1994 | Davis | |
| 5,348,338 A | | 9/1994 | Kuriki et al. | |
| 5,351,790 A | * | 10/1994 | Machida | 188/314 |
| 5,522,481 A | | 6/1996 | Watanabe | |
| 5,572,425 A | | 11/1996 | Levitt et al. | |
| 5,577,579 A | | 11/1996 | Derr | |
| 5,584,498 A | * | 12/1996 | Danek | 280/5.503 |
| 5,627,751 A | | 5/1997 | Davis et al. | |
| 5,769,400 A | | 6/1998 | Holzl et al. | |
| 6,145,859 A | | 11/2000 | Altherr et al. | |
| 6,264,212 B1 | | 7/2001 | Timoney | |
| 6,293,530 B1 | | 9/2001 | Delorenzis et al. | |
| 6,305,673 B1 | | 10/2001 | Delorenzis et al. | |
| 6,328,125 B1 | * | 12/2001 | Van Den Brink et al. | 180/211 |
| 6,389,341 B1 | | 5/2002 | Davis | |

* cited by examiner

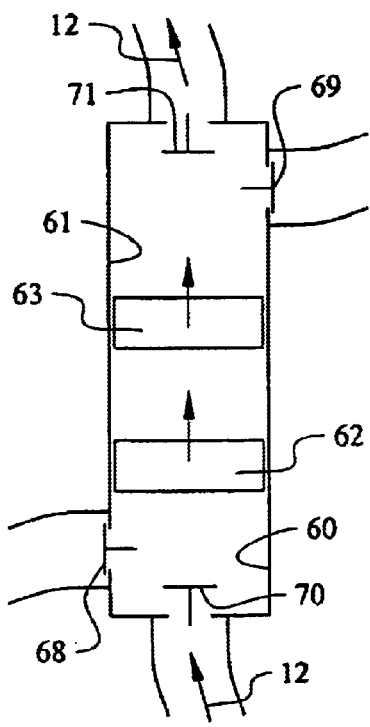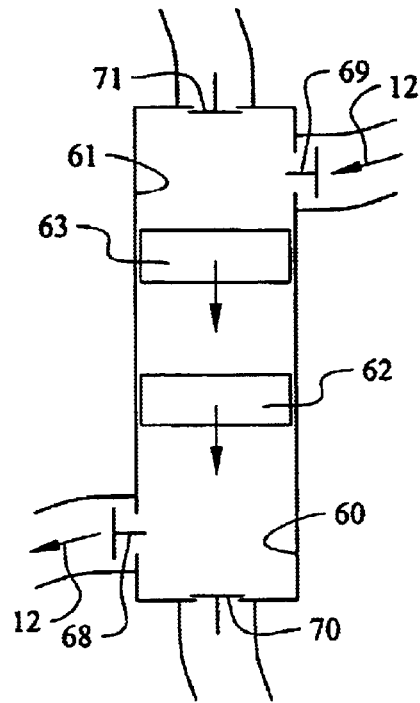
FIGURE 5A　　　　　FIGURE 5B
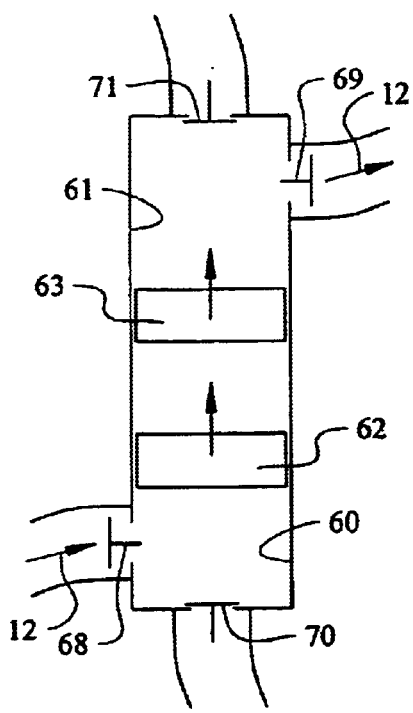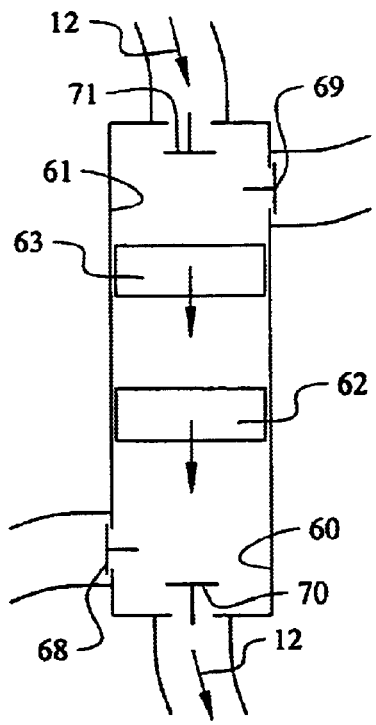
FIGURE 6A　　　　　FIGURE 6B

US 6,814,364 B2

SUSPENSION SYSTEM FOR A VEHICLE

CROSS-REFERENCE TO RELATED APPLICATIONS

The present invention is a continuation-in-part of International Application No. PCT/US01/48488, filed Dec. 7, 2001 and entitled "Suspension System For A Vehicle", which claims benefit of U.S. provisional application Ser. No. 60/251,951, filed Dec. 7, 2000 and entitled "Compressible Fluid Strut".

TECHNICAL FIELD

The subject matter of this invention generally relates to suspension systems for a vehicle and, more particularly, to suspension systems including a volume modulator with first and second modulator pistons.

BACKGROUND

In the typical vehicle, a combination of a coil spring and a gas strut function to allow compression movement of a wheel toward the vehicle and rebound movement of the wheel toward the ground. The suspension struts attempt to provide isolation of the vehicle from the roughness of the road and resistance to the roll of the vehicle during a turn. More specifically, the typical coil spring provides a suspending spring force that biases the wheel toward the ground and the typical gas strut provides a damping force that dampens both the suspending spring force and any impact force imparted by the road. Inherent in every conventional suspension strut is a compromise between ride (the ability to isolate the vehicle from the road surface) and handling (the ability to resist roll of the vehicle). Vehicles are typically engineered for maximum road isolation (found in the luxury market) or for maximum roll resistance (found in the sport car market). There is a need, however, for an improved suspension system that avoids this inherent compromise.

BRIEF DESCRIPTION OF THE DRAWINGS

FIGS. 5A, 5B, 6A, and 6B are schematic views of the different stages of the volume modulator of FIG. 4.

DETAILED DESCRIPTION OF THE PREFERRED EMBODIMENT

The following description of the preferred embodiment of the invention is not intended to limit the invention to the preferred embodiment, but rather to enable any person skilled in the art of suspension systems to use this invention.

Figure 1:
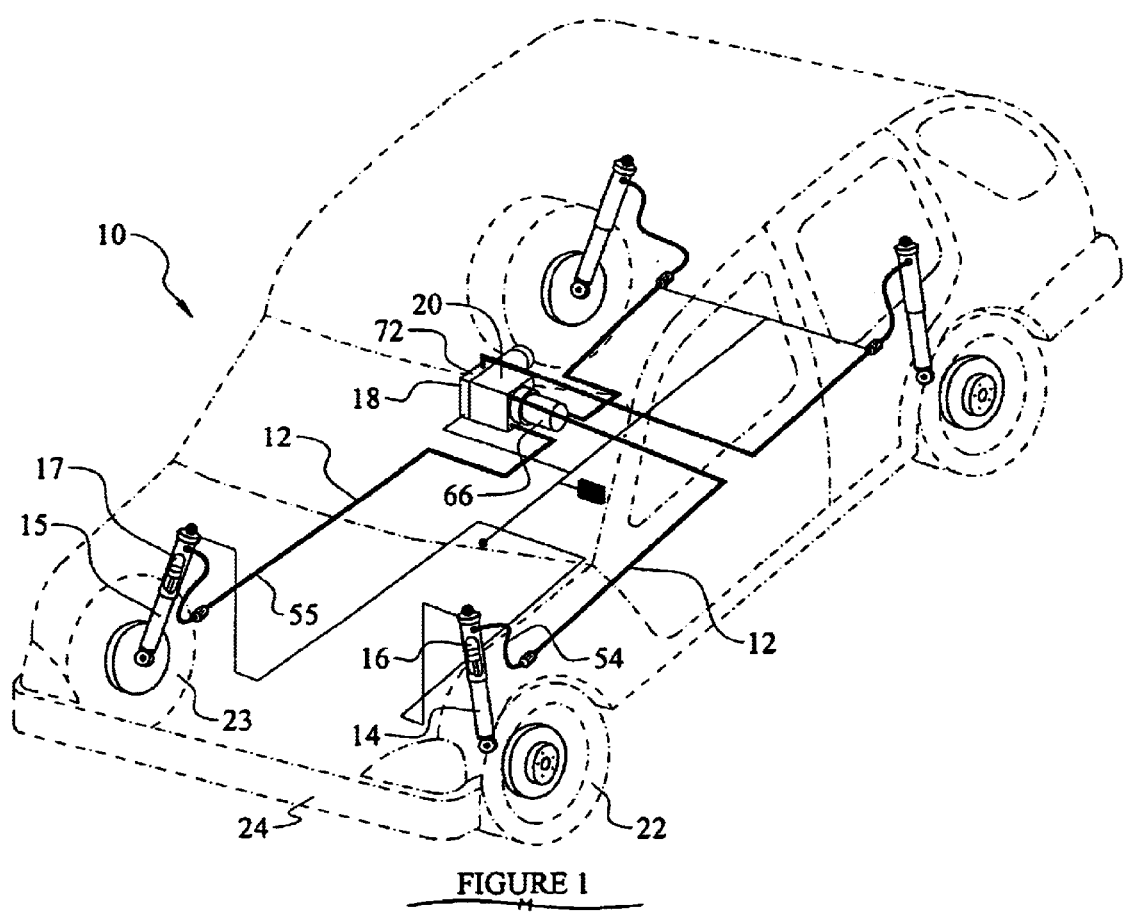
FIG. 1 is a cut away perspective view of the suspension system of the preferred embodiment, shown within a vehicle.

As shown in FIG. 1, the suspension system 10 of the preferred embodiment includes a fluid 12, a first suspension strut 14, a second suspension strut 15, a first hydraulic cavity 16, a second hydraulic cavity 17, a reservoir 18, and a volume modulator 20. The first hydraulic cavity 16, which is at least partially defined by the first suspension strut 14, contains a portion of the fluid 12 and cooperates with the fluid 12 to supply a first suspending spring force that biases a left wheel 22 toward the surface. The second hydraulic cavity 17, which is at least partially defined by the second suspension strut 15, contains a portion of the fluid 12 and cooperates with the fluid 12 to supply a second suspending spring force that biases a right wheel 23 toward the surface. The volume modulator 20, which is coupled to the first hydraulic cavity 16, to the second hydraulic cavity 17, and to the reservoir 18, selectively pushes the fluid 12 from the reservoir 18 into the hydraulic cavities 16 and 17 and vents the fluid 12 from the hydraulic cavities 16 and 17 into the reservoir 18, thereby actively modulating the suspending spring forces. By increasing the suspending spring force in the suspension strut of the outside wheel and decreasing the suspending spring force in the suspension strut of the inside wheel during a turn, the vehicle can better resist roll. By decreasing the suspending spring force over rough surfaces, the vehicle can better isolate the passengers. Thus, by actively modulating the suspending spring forces, the vehicle can maximize both ride and handling and avoid the inherent compromise of conventional suspension systems.

Figure 2:
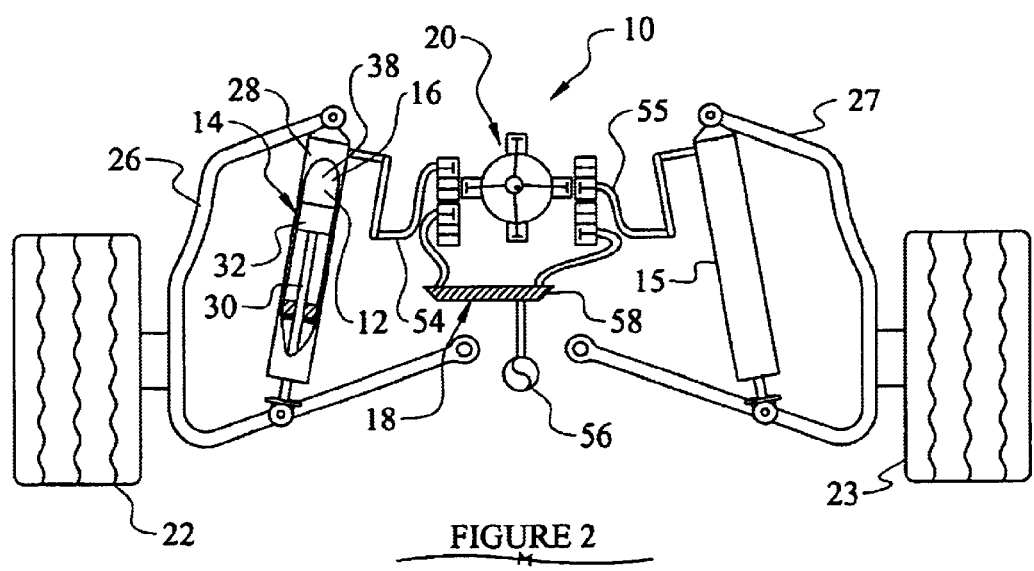
FIG. 2 is a rear schematic view of the suspension system of FIG. 1.

As shown in FIGS. 1 and 2, the suspension system 10 of the preferred embodiment has been specifically designed for a vehicle 24 having left and right suspension links 26 and 27 (shown in FIG. 2) suspending the individual wheels 22 and 23 from the vehicle 24. The suspension links 26 and 27 allow compression movement of the individual wheels 22 and 23 toward the vehicle 24 and rebound movement of the individual wheels 22 and 23 toward the road surface. Despite this design for a particular environment, the suspension system 10 may be used in any suitable environment, such as other vehicles with more wheels.

The fluid 12 of the preferred embodiment, which cooperates to supply the suspending spring force, is preferably a compressible fluid. Further, the compressible fluid is preferably a silicon fluid that compresses about 1.5% volume at 2,000 psi, about 3% volume at 5,000 psi, and about 6% volume at 10,000 psi. Above 2,000 psi, the compressible fluid has a larger compressibility than conventional hydraulic oil. The compressible fluid, however, may alternatively be any suitable fluid, with or without a silicon component, that provides a larger compressibility above 2,000 psi than conventional hydraulic oil.

Figure 3:
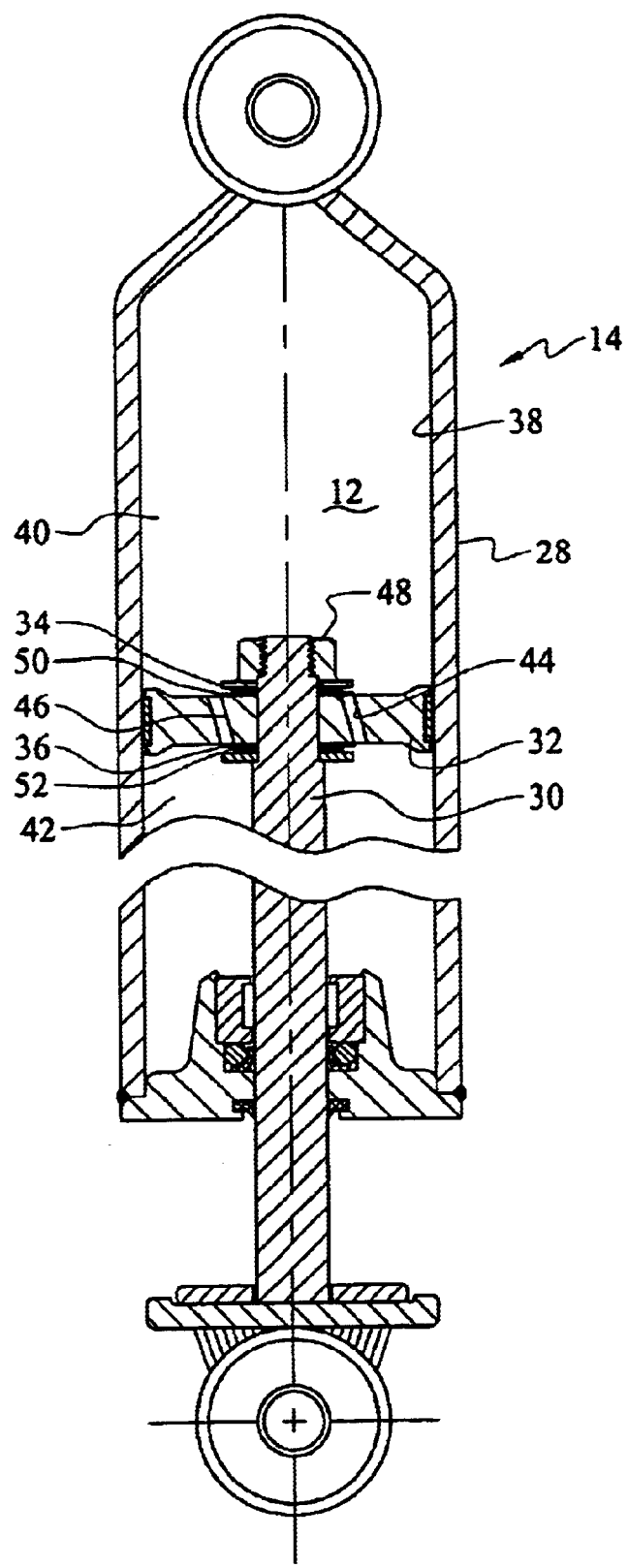
FIG. 3 is a cross-sectional view of a suspension strut of the suspension system of FIG. 1.

As shown in FIGS. 2 and 3, the suspension struts 14 and 15 of the preferred embodiment include a hydraulic tube 28, a displacement rod 30, a cavity piston 32, a first variable restrictor 34, and a second variable restrictor 36. The hydraulic tube 28 and displacement rod 30 of the preferred embodiment cooperatively function to couple the suspension link and the vehicle and to allow compression movement of a wheel toward the vehicle and rebound movement of the wheel toward the road surface. The hydraulic tube 28 preferably defines an inner cavity 38, which functions to contain a portion of the compressible fluid 12. As previously mentioned, the inner cavity 38 and the compressible fluid 12 preferably cooperate to supply the suspending spring force that biases the wheel toward the surface and, essentially, suspend the entire vehicle above the surface. The displacement rod 30 is adapted to move into the inner cavity 38 upon the compression movement of the wheel and to move out of the inner cavity 38 upon the rebound movement of the wheel. As it moves into the inner cavity 38, the displacement rod 30 displaces, and thereby compresses, the compressible fluid 12. In this manner, the movement of the displacement rod 30 into the inner cavity 38 increases the suspending spring force of the suspension strut. As the displacement rod 30 moves out of the inner cavity 38, the compressible fluid 12 decompresses and the suspending spring force of the suspension strut decreases. The displacement rod 30 is preferably cylindrically shaped and, because of this preference, the displacement of the displacement rod 30 within the inner cavity 38 and the magnitude of the suspending spring force have a linear relationship. If a linear relationship is not preferred for the particular application of the suspension strut, or if there is any other appropriate reason, the displacement rod 30 may be alternatively designed with another suitable shape. The hydraulic tube 28 and the displacement rod 30 are preferably made from conventional steel and with conventional methods, but may alternatively be made from any suitable material and with any suitable method.

The cavity piston 32 of the preferred embodiment is preferably coupled to the displacement rod 30 and preferably extends to the hydraulic tube 28. In this manner, the cavity piston 32 separates the inner cavity 38 into a first section 40 and a second section 42. The cavity piston 32 defines a first orifice 44 and a second orifice 46, which both preferably extend between the first section 40 and the second section 42 of the inner cavity 38. The first orifice 44 and the second orifice 46 function to allow flow of the compressible fluid 12 between the first section 40 and the second section 42 of the inner cavity 38. The cavity piston 32 is preferably securely mounted to the displacement rod 30 by a conventional fastener 48, but may alternatively be integrally formed with the displacement rod 30 or securely mounted with any suitable device. The cavity piston 32 is preferably made from conventional materials and with conventional methods, but may alternatively be made from other suitable materials and with other suitable methods.

The first variable restrictor 34 of the preferred embodiment is coupled to the cavity piston 32 near the first orifice 44. The first variable restrictor 34 functions to restrict the passage of the compressible fluid 12 through the first orifice 44 and, more specifically, functions to variably restrict the passage based on the velocity of the cavity piston 32 relative to the hydraulic tube 28. In the first preferred embodiment, the first variable restrictor 34 is a first shim stack 50 preferably made from conventional materials and with conventional methods. In alternative embodiments, the first variable restrictor 34 may include any other suitable device able to variably restrict the passage of the compressible fluid 12 through the first orifice 44 based on the velocity of the cavity piston 32 relative to the hydraulic tube 28. The second variable restrictor 36 of the preferred embodiment is coupled to the cavity piston 32 near the second orifice 46. The second variable restrictor 36—like the first variable restrictor 34—functions to restrict the passage of the compressible fluid 12 through the second orifice 46 and, more specifically, functions to variably restrict the passage based on the velocity of the cavity piston 32 relative to the hydraulic tube 28. In the preferred embodiment, the second variable restrictor 36 is a second shim stack 52 preferably made from conventional materials and with conventional methods. In alternative embodiments, the second variable restrictor 36 may include any suitable device able to variably restrict a passage of the compressible fluid 12 through the second orifice 46 based on the velocity of the cavity piston 32 relative to the hydraulic tube 28.

The cavity piston 32, the first orifice 44, and the first variable restrictor 34 of the preferred embodiment cooperate to supply the rebound damping force during the rebound movement of the wheel. The rebound damping force acts to dampen the suspending spring force that tends to push the displacement rod 30 out of the hydraulic tube 28. The cavity piston 32, the second orifice 46, and a second variable restrictor 36, on the other hand, cooperate to supply the compression damping force during the compression movement of the wheel. The compression damping force acts to dampen any impact force that tends to push the displacement rod 30 into the hydraulic tube 28.

The suspension struts 14 and 15 of the preferred embodiment are further described in U.S. application filed on Dec. 7, 2001, entitled "Compressible Fluid Strut", and assigned to Visteon Global Technologies, Inc. As described in that application, the suspension struts may include a pressure vessel and may include a valve. In alternative embodiments, the suspension struts may include any suitable device to allow active modulation of the suspending spring force with compressible fluid.

As shown in FIG. 1, the suspension system 10 of the preferred embodiment also includes a first hydraulic line 54 adapted to communicate the compressible fluid 12 between the first suspension strut 14 and the volume modulator 20 and a second hydraulic line 55 adapted to communicate the compressible fluid 12 between the second suspension strut 15 and the volume modulator 20. Together with the inner cavity 38 of the individual suspension struts 14 and 15, the hydraulic lines 54 and 55 define the first and second hydraulic cavities 16 and 17. Preferably, the compressible fluid 12 flows freely between the volume modulator 20 and the inner cavity 38 of the individual suspension struts 14 and 15. Alternatively, the hydraulic cavities 16 and 17 may include one or more controllable valves such that the hydraulic cavities 16 and 17 are entirely defined by the suspension struts 14 and 15 or by the suspension struts 14 and 15 and a portion of the hydraulic lines 54 and 55.

As shown in FIG. 2, the reservoir 18 of the preferred embodiment functions to contain a portion of the compressible fluid 12 that has been vented from the hydraulic cavities 16 and 17 and that may eventually be pushed into the hydraulic cavities 16 and 17. The reservoir 18 is preferably made from conventional materials and with conventional methods, but may alternatively be made from any suitable material and with any suitable method. The suspension system 10 of the preferred embodiment includes a pump 56 adapted to pressurize the compressible fluid 12 within the reservoir 18. In this manner, the reservoir 18 acts as an accumulator 58. By using compressible fluid 12 under a pressure of about 1500 psi within the reservoir 18, the volume modulator 20 consumes less energy to reach a particular pressure within an individual hydraulic cavity 16. In an alternative embodiment, the compressible fluid 12 within the reservoir 18 may be at atmospheric pressure or may be vented to the atmosphere.

The volume modulator 20 of the preferred embodiment is coupled to the hydraulic lines 54 and 55 and to the reservoir 18. The volume modulator 20, as previously mentioned, functions to selectively push the compressible fluid 12 into the hydraulic cavities 16 and 17 and to vent the compressible fluid 12 from the hydraulic cavities 16 and 17. In the preferred embodiment, the volume modulator 20 shares elements with the digital displacement pump/motor described in U.S. Pat. No. 5,259,738 entitled "Fluid-Working Machine" and issued to Salter et al. on Nov. 9, 1993, which is incorporated in its entirety by this reference.

Figure 4:
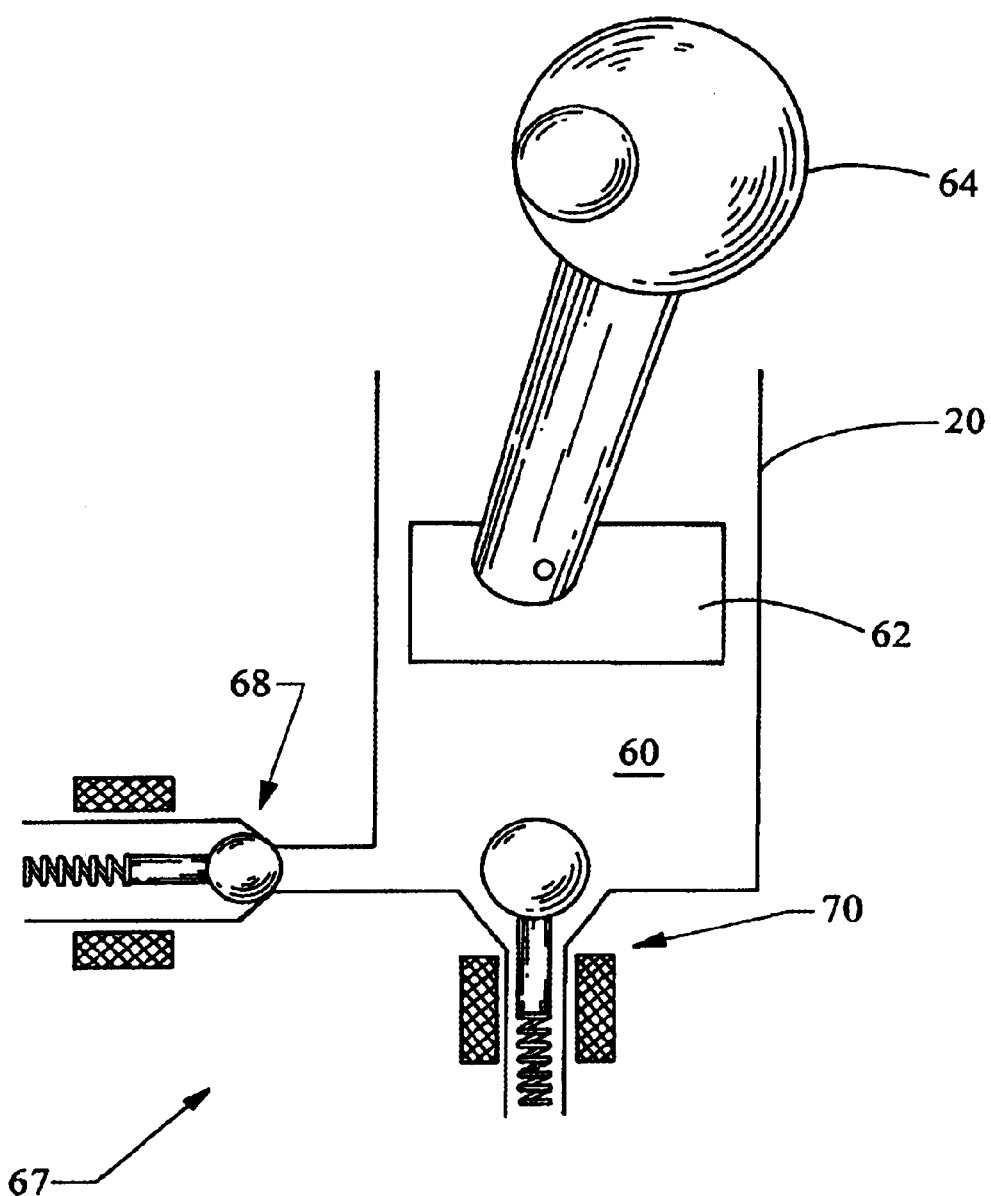
FIG. 4 is a detailed view of the volume modulator of the suspension system of FIG. 1.

As shown in FIG. 4, the volume modulator 20 of the preferred embodiment defines a first modulator cavity 60 and a second modulator cavity 61, and includes a first modulator piston 62 adapted to continuously cycle through a compression stroke and an expansion stroke within the first modulator cavity 60 and a second modulator piston 63 adapted to continuously cycle through a compression stroke and an expansion stroke within the second modulator cavity 61. Both modulator pistons 62 and 63 are preferably connected to an eccentric 64 that is rotated by a motor 66 (shown in FIG. 1). In the preferred embodiment, the first modulator piston 62 and the second modulator piston 63 are located approximately 180° apart relative to the eccentric 64. This particular arrangement minimizes power consumption of the volume modulator and minimizes reaction time of the suspension system during roll of the vehicle. Because of the "active" nature of the modulation of the suspending spring force, the modulator piston 62 cycles through the compression stroke and expansion stroke at a relatively high frequency (up to 30 Hz) and, thus, the motor preferably rotates at a relatively high rotational velocity (up to 2000 rpm).

The volume modulator 20 of the preferred embodiment also includes a first cavity-side valve 68 coupled between the first hydraulic line and the volume modulator 20, a second cavity-side valve 69 coupled between the second hydraulic line and the volume modulator 20, a first reservoir-side valve 70 coupled between the reservoir and the volume modulator 20, and a second reservoir-side valve 71 coupled between the reservoir and the volume modulator. The cavity-side valves 68 and 69 and the reservoir-side valves 70 and 71 function to selectively restrict the passage of the compressible fluid. Preferably, the cavity-side valves 68 and 69 and the reservoir-side valves 70 and 71 are so-called poppet valves that may be actuated at relatively high frequencies. Alternatively, the cavity-side valves 68 and 69 and the reservoir-side valves 70 and 71 may be any suitable device that selectively restricts the passage of the compressible fluid at an adequate frequency.

As shown in FIGS. 5A and 5B, the cavity-side valves 68 and 69, the reservoir-side valves 70 and 71, and the modulator pistons 62 and 63 can cooperate to counteract roll during a right turn of the vehicle. In the first stage, as shown in FIG. 5A, the first cavity-side valve 68 is closed, the first reservoir-side valve 70 is opened, the second cavity-side valve 69 is closed, and the second reservoir-side valve 71 is opened, while the first modulator piston 62 increases the volume in the first modulator cavity 60 (the expansion stroke) and the second modulator piston 63 decreases the volume in the second modulator cavity 61 (the compression stroke). The expansion stroke of the first modulator piston 62 draws the compressible fluid 12 into the first modulator cavity 60, and the compression stroke of the second modulator piston 63 pushes the compressible fluid 12 into the reservoir.

During the second stage, as shown in FIG. 5B, the first cavity-side valve 68 is opened, the first reservoir-side valve 70 is closed, the second cavity-side valve 69 is opened, and the second reservoir-side valve 71 is closed, while the first modulator piston 62 decreases the volume in the first modulator cavity 60 (the compression stroke) and the second modulator piston 63 increases the volume in the second modulator cavity 61 (the expansion stroke). The compression stroke of the first modulator piston 62 pushes the compressible fluid 12 into the first hydraulic cavity, which increases the suspending spring force at the first suspension strut and left wheel, and the expansion stroke of the second modulator piston 63 vents the compressible fluid from the second hydraulic cavity, which decreases the suspending spring force at the second suspension strut and right wheel.

As shown in FIGS. 6A and 6B, the cavity-side valves 68 and 69, the reservoir-side valves 70 and 71, and the modulator piston 62 can also cooperate to counteract roll during a left turn of the vehicle. In the first stage, as shown in FIG. 6A, the first cavity-side valve 68 is opened, the reservoir-side valve 70 is closed, the second cavity-side valve 69 is opened, and the second reservoir-side valve 71 is closed, while the first modulator piston 62 increases the volume in the first modulator cavity 60 (the expansion stroke) and the second modular cavity 61 (the compression stroke). During the second stage, as shown in FIG. 6B, the first cavity-side valve 68 is closed, the first reservoir-side valve 70 is opened, the second cavity-side valve 69 is closed, and the second reservoir-side valve 71 is opened while the first modulator piston 62 decreases the volume in the first modulator cavity 60 (the compression stroke) and the second modulator piston 63 increases the volume in the second modulator cavity 61 (the expansion stroke).

During the operation of the vehicle, it may be advantageous to neither increase nor decrease the suspending spring forces. Since the motor 66, the eccentric 64, and the modulator pistons 62 and 63 are preferably continuously moving, the first and second reservoir-side valves 70 and 71 and the volume modulator 20 can also cooperate to draw compressible fluid 12 from the reservoir (shown in FIG. 5A) and vent the compressible fluid 12 back into the reservoir (shown in FIG. 6B). This process does not modulate the pressure of the hydraulic cavities 16 and 17 and does not increase or decrease the suspending spring forces.

Although FIGS. 5A, 5B, 6A, and 6B show only two modulator cavities 60 and 61 and two modulator pistons 62 and 63, the volume modulator 20 preferably includes a modulator cavity, a modulator piston, a cavity-side valve, and a reservoir-side valve for each suspension strut on the vehicle. In a vehicle with four wheels, the modulator pistons for the front left and right wheels are preferably located approximately 180° apart relative to the eccentric, and the modulator pistons for the rear left and right wheels are preferably located approximately 180° apart relative to the eccentric.

As shown in FIG. 1, the suspension system 10 of the preferred embodiment also includes a control unit 72 (shown in FIG. 1) which functions to individually control the first and second cavity-side valves 68 and 69 and first and second reservoir-side valves 70 and 71 corresponding to the first and second suspension struts 14 and 15 and left and right wheels 22 and 23 to adjust the ride and handling of the vehicle 24 on a wheel-to-wheel basis. The control unit 72 may also function to adjust particular suspension struts on a side-by-side basis of the vehicle 24 to adjust the roll or the pitch of the vehicle 24. The control unit 72 may further function to adjust all of the suspension struts to adjust the ride height of the vehicle 24. The control unit 72 is preferably made from conventional material and with conventional methods, but may alternatively be made from any suitable material and with any suitable method.

As any person skilled in the art of suspension systems will recognize from the previous detailed description and from the figures and claims, modifications and changes can be made to the preferred embodiment of the invention without departing from the scope of this invention defined in the following claims.

We claim:

1. A suspension system for a vehicle having left and right wheels contacting a surface under the vehicle and first and second suspension links respectively suspending the left and right wheels from the vehicle and allowing relative movement of the left and right wheels and the vehicle, said suspension system comprising:

a first suspension strut adapted to couple the first suspension link and the vehicle;

a first hydraulic cavity at least partially defined by said first suspension strut and adapted to contain a portion of a fluid and to cooperate with the fluid to supply a first suspending spring force that biases the left wheel toward the surface;

a second suspension strut adapted to couple the second suspension link and the vehicle;

a second hydraulic cavity at least partially defined by said second suspension strut and adapted to contain a portion of the fluid and to cooperate with the fluid to supply a second suspending spring force that biases the right wheel toward the surface;

a volume modulator coupled to said first and second hydraulic cavities and a reservoir and adapted to selectively push fluid into said first and second hydraulic cavities and vent fluid from said first and second hydraulic cavities thereby actively modulating said first and second suspending spring forces, wherein said volume modulator defines a first modulator cavity and a second modular cavity and includes a first modulator piston adapted to cycle through a compression stroke and an expansion stroke within said first modulator cavity, a first cavity-side valve coupled between said first hydraulic cavity and said modulator first cavity, a first reservoir-side valve coupled between the reservoir and said first modulator cavity, a second modular piston adapted to cycle through a compression stroke and an expansion stroke within said second modulator cavity, a second cavity-side valve coupled between said second hydraulic cavity and said second modulator cavity, and a second reservoir-side valve coupled between the reservoir and said second modulator cavity; and a compressible fluid, wherein said first and second hydraulic cavities are adapted to contain a portion of said compressible fluid.

2. The suspension system of claim 1 wherein said volume modulator is adapted to selectively push and vent said compressible fluid.

3. The suspension system of claim 2 wherein said compressible fluid includes a silicone fluid.

4. The suspension system of claim 2 wherein said compressible fluid has a larger compressibility above 2,000 psi than hydraulic oil.

5. The suspension system of claim 2 wherein said compressible fluid is adapted to compress about 1.5% volume at 2,000 psi, about 3% volume at 5,000 psi, and about 6% volume at 10,000 psi.

6. The suspension system of claim 1 wherein said first suspension strut includes a displacement rod adapted to move into said first hydraulic cavity and to compress the fluid upon the relative movement of the left wheel and the vehicle.

7. The suspension system of claim 6 wherein said displacement rod includes a cavity piston adapted to supply a damping force.

8. The suspension system of claim 1 wherein said first hydraulic cavity is defined by said first suspension strut and a hydraulic line adapted to communicate the fluid between said first suspension strut and said volume modulator.

9. The suspension system of claim 1 further comprising a motor adapted to provide rotational output; and an eccentric coupled to said motor, to said first modulator piston, and to said second modulator piston and adapted to translate the rotational output of said motor into cycles of compression strokes and expansion strokes of said first modulator piston and said second modulator piston.

10. The suspension system of claim 9 wherein said first modulator piston and said second modulator piston are located approximately 180° apart relative to said eccentric.

11. The suspension system of claim 1 further comprising an electric control unit coupled to said volume modulator and adapted to close said first cavity-side valve, open said first reservoir-side valve, close said second cavity-side valve, and open said second reservoir-side valve during said expansion stroke of said first modulator piston and during said compression stroke of said second modulator piston and adapted to open said first cavity-side valve, close said first reservoir-side valve, open said second cavity-side valve, and close said second reservoir-side valve during said compression stroke of said first modulator piston and during said expansion stroke of said second modulator piston, thereby pushing fluid into said first hydraulic cavity while venting fluid from said second hydraulic cavity to counteract roll of the vehicle.

12. The suspension system of claim 11 wherein said electric control unit is further adapted to open said first cavity-side valve, close said first reservoir-side valve, open said second cavity-side valve, and close said second reservoir-side valve during said expansion stroke of said first modulator piston and during said compression stroke of said second modulator piston and adapted to close said first cavity-side valve, open said first reservoir-side valve, close said second cavity-side valve, and open said second reservoir-side valve during said compression stroke of said first modulator piston and during said expansion stroke of said second modulator piston, thereby pushing fluid into said second hydraulic cavity while venting fluid from the first hydraulic cavity to counteract roll of the vehicle.

13. The suspension system of claim 1 further comprising a reservoir coupled to said first and second reservoir-side valves and adapted to contain a portion of the fluid.

14. The suspension system of claim 13 further comprising a pump adapted to pressurize said compressible fluid within said reservoir.

* * * * *